United States Patent [19]
Nilsson et al.

[11] 3,932,087
[45] Jan. 13, 1976

[54] ARRANGEMENT IN MOULDING PRESSES WITH PARTED PRESS TOOLS FOR THE PRODUCTION OF HOT-PRESSED PLASTIC MATERIAL PRODUCTS, ESPECIALLY GRAMMOPHONE RECORDS

[75] Inventors: Östen Karl Alf Nilsson, Spanga; Curt Lindell, Taby, both of Sweden

[73] Assignee: Toolex Alpha Aktiebolag, Sundbyberg, Sweden

[22] Filed: Jan. 2, 1975

[21] Appl. No.: 538,208

[30] Foreign Application Priority Data
Jan. 7, 1974   Sweden............................. 7400162
Dec. 19, 1974  Sweden............................. 7416026

[52] U.S. Cl. ............... 425/215; 425/444; 425/810; 425/116
[51] Int. Cl.²........................................ B29D 17/00
[58] Field of Search ........... 425/114, 116, 123, 511, 425/810, 444, 215

[56] References Cited
UNITED STATES PATENTS
2,743,478   5/1956   Harlow et al. ................ 425/511 X
3,186,029   6/1965   Joseph ............................. 425/123
3,526,690   9/1970   Bachman .......................... 425/114
3,528,127   9/1970   Damm et al. ...................... 425/116
3,635,622   1/1972   Wechsler .......................... 425/116
3,663,136   5/1972   Westermann ....................... 425/116

*Primary Examiner*—J. Howard Flint, Jr.
*Attorney, Agent, or Firm*—Stevens, Davis, Miller & Mosher

[57] ABSTRACT

In a moulding press with parted press tools for producing hot-pressed products of plastic materials, particularly grammophone records, an arrangement for holding and handling the products, which is movable between the pressing area and a stripping apparatus situated outside said area, said arrangement incorporating a holder provided with means for anchoring the pressed product to it while utilizing the excess material exuding during pressing from between the tool halves.

20 Claims, 12 Drawing Figures

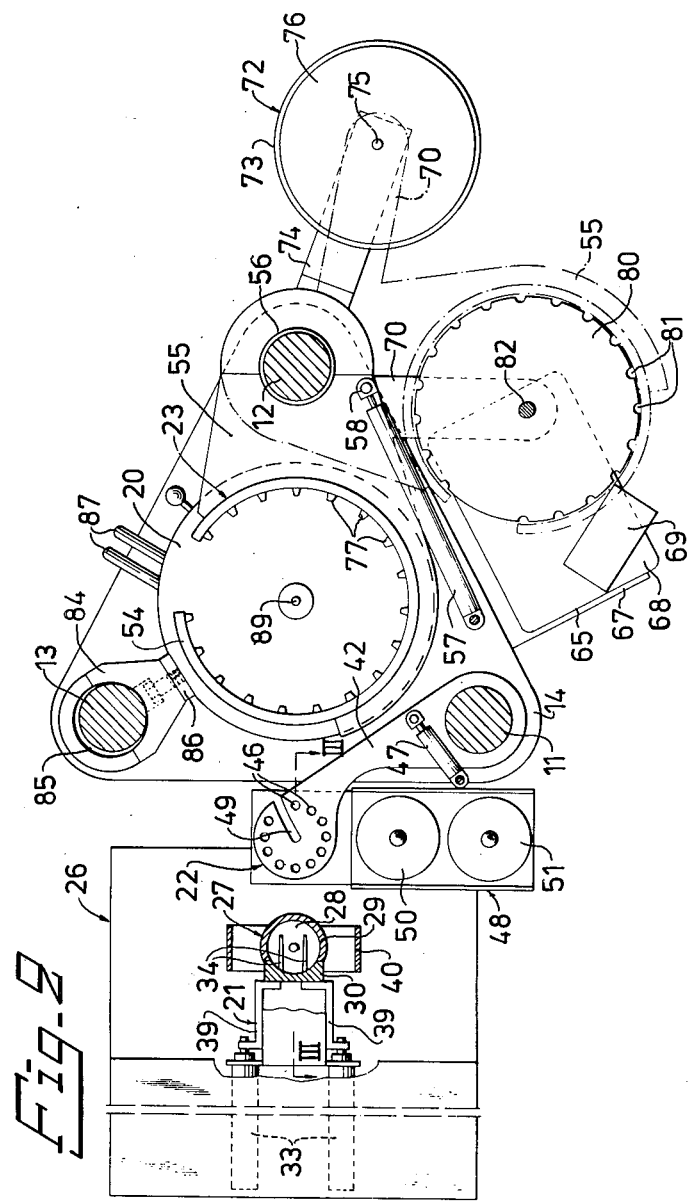

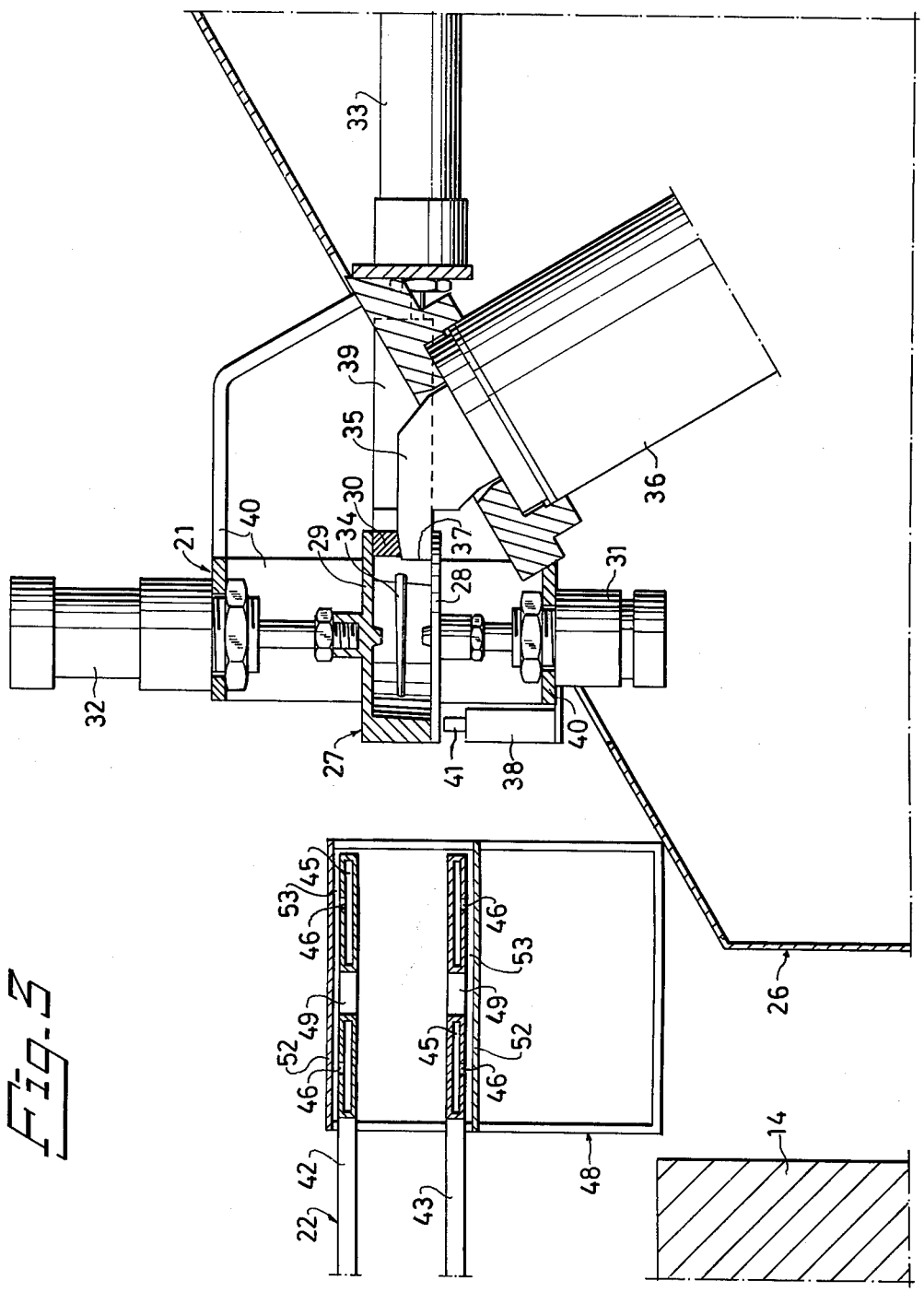

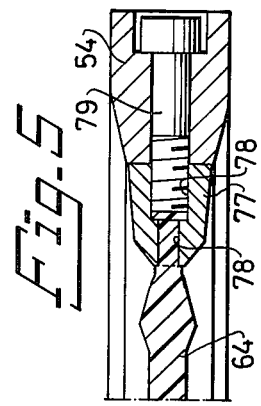
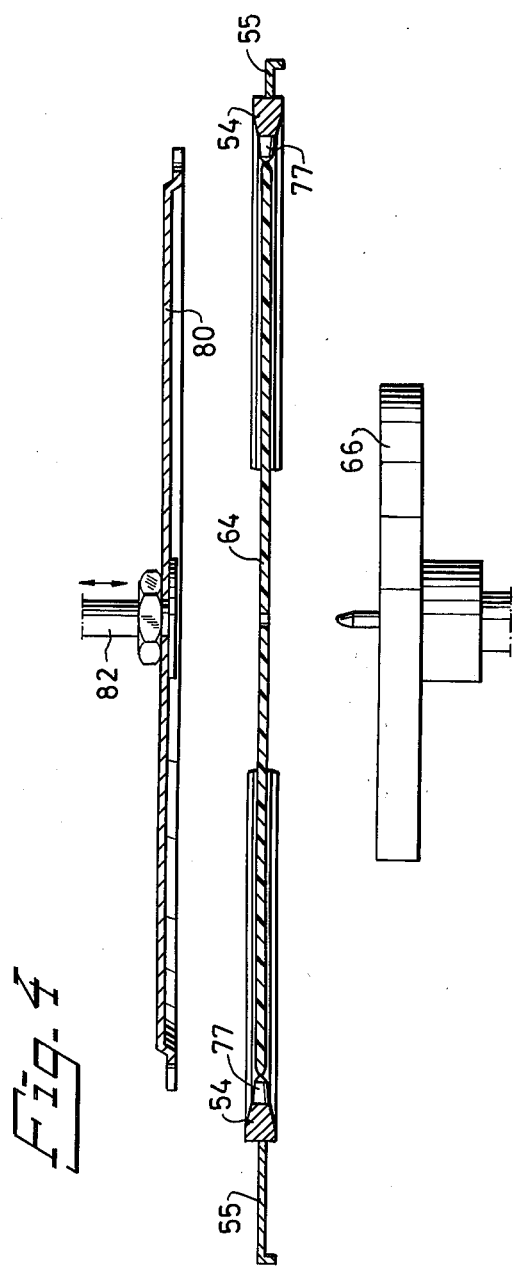

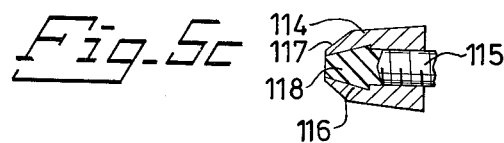
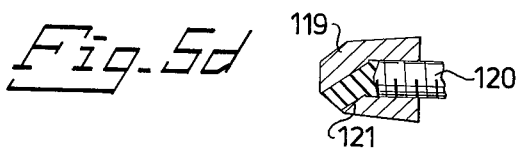
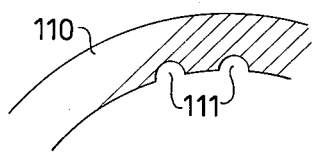
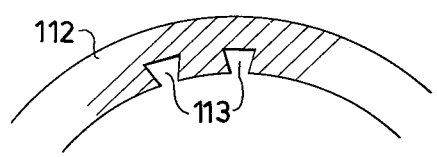
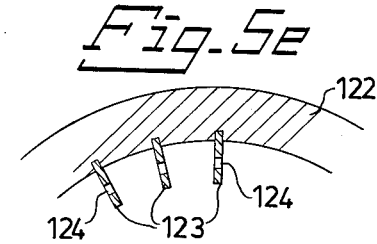
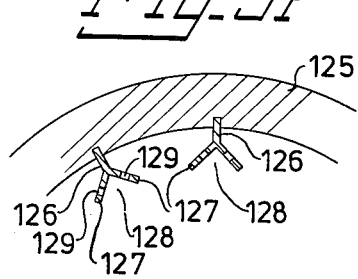

ARRANGEMENT IN MOULDING PRESSES WITH PARTED PRESS TOOLS FOR THE PRODUCTION OF HOT-PRESSED PLASTIC MATERIAL PRODUCTS, ESPECIALLY GRAMMOPHONE RECORDS

The present invention relates to an arrangement in moulding presses with parted press tools for the production of hot-pressed products of plastic material, especially grammophone records, a holder for the pressed product being arranged, before starting the pressing operation to be entered into an exuding zone for the excess material from the pressing operation to assure its position in the press, and subsequent to the termination of the pressing operation, in company with the ready-pressed product attached thereto through the intermediary of the excess material exuded during the pressing operation, to be moved away to an apparatus for releasing the ready-pressed product from the holder, situated outside the pressing area.

Through the German Offenlegungsschrift No. 2,016,749, for example, it has earlier been proposed, in moulding presses of the kind set forth above, to arrange two holding elements, diametrically opposed with relation to the centre of the press tool, outside its edge zone whereto the excess material from the pressure moulding operation exudes, said elements being on the one hand mounted for parallel movement by means of guiding elements, and on the other hand each presenting a T-shaped groove. These grooves are mutually parallel, placed in the plane of movement of the holding elements and open out towards each other in the said edge zone, whereto the excess material from the pressing operation exudes.

Before starting a pressing operation, both the holding elements are entered into position in relation to the press tool, whereafter the pressure moulding is performed. Simultaneously therewith the excess material exudes substantially annularly around the pressed grammophone record, the excess material appearing in front of the holding elements making its way into both the T-shaped grooves, to fill the same in such a way that the pressed grammophone record subsequent to solidification is anchored in the holding elements via the excess material in the slots. When the press tool halves are thereafter moved apart to expose the ready-pressed record with attached excess material, both holding elements are commonly displaced from the pressing area in company with the record and the excess material to a station situated outside said area, in which T-shaped ribs of excess material formed in said T-shaped grooves are pushed completely out of said grooves by relative movement between said ribs and said holding elements. The holding elements with the grooves liberated from the excess material are thereafter returned to their active position in the press in readiness for a repeated pressing operation, while the record itself it cut free from excess material by a cutting wheel in a cutting apparatus, and possibly edge trimmed.

Although the device described above shows good retaining characteristics per se, with relation to the pressed grammophone record, and furthermore simplifies conveyance and the further handling of said record, it causes in practice a number of inconveniances, especially in mass production.

Since, immediately after a terminated press operation the plastic material has not yet solidified to a solid consistency, and because the ready-pressed record can only be held, for obvious reasons, at two diametrically opposed places, it may happen that the unsupported portions of the record are deflected out of the intended plane of the record and solidify to form a curved disc which is not acceptable as a final product, and must be rejected.

In order to avoid or at least lessen these drawbacks, the thickness of the pressed product can indeed be increased, but an uneconomical measure is thereby introduced into the process, at the same time as the cooling time has to be increased considerably, which further contributes to deterioration of the economical gain in fabrication.

Furthermore it involves unnecessary circuitousness and time delay in having first to release the excess material from the holding elements by a special device in order to release the grammophone record itself, thereafter cutting the excess material away from the periphery of the record by means of a cutting wheel.

The object of the invention is therefore to provide an arrangement in moulding presses of the kind in question, which enables grammophone records having a small thickness to be manufactured, especially in series, in an economically advantageous manner, even from the point of view of time.

In accordance herewith, the invention is mainly characterized in that the holder presents a ring, encircling at least the major portion of the perimeter of the pressed product, comprising a plurality of anchoring means distributed in and along the exuding zone of the excess material for attaching the pressed product to the holder by the excess material exuding onto, and solidifying in engagement with said anchoring means, and that said apparatus includes a shearing means, movable essentially transverse to the plane of the ring of anchoring means, for breaking the pressed product loose in the region of said anchoring means.

The invention will now be more closely described with reference to an embodiment diagrammatically shown on the attached drawing, and in connection therewtih further characterizing features and advantages of the invention will be apparent.

FIG. 2 is a horizontal section taken essentially along the line II—II in FIG. 1.

FIG. 3 is a fragmentary vertical section taken along the line III—III in FIG. 2, which shows an auxiliary tool for metering and preforming a plastic compound from which the product is to be pressed, and for introducing this compound into the pressing area.

FIG. 4 is a fragmentary vertical section showing a portion of an auxiliary tool for removing ready-pressed grammophone records from the working area of the press and for delivering the same to an edge trimming station.

FIG. 5 illustrates in section and to a larger scale a portion of the apparatus according to FIG. 4, showing a preferred embodiment of an anchoring means according to the invention for attaching the exuding excess material to the holder.

FIGS. 5A, 5B, 5C, 5D, 5E and 5F show alternative embodiments of said anchoring means according to the invention for attaching the excess material to the holder.

On the drawing, similar or essentially similar details in all the Figures are provided with the same reference numerals.

Figure 1:
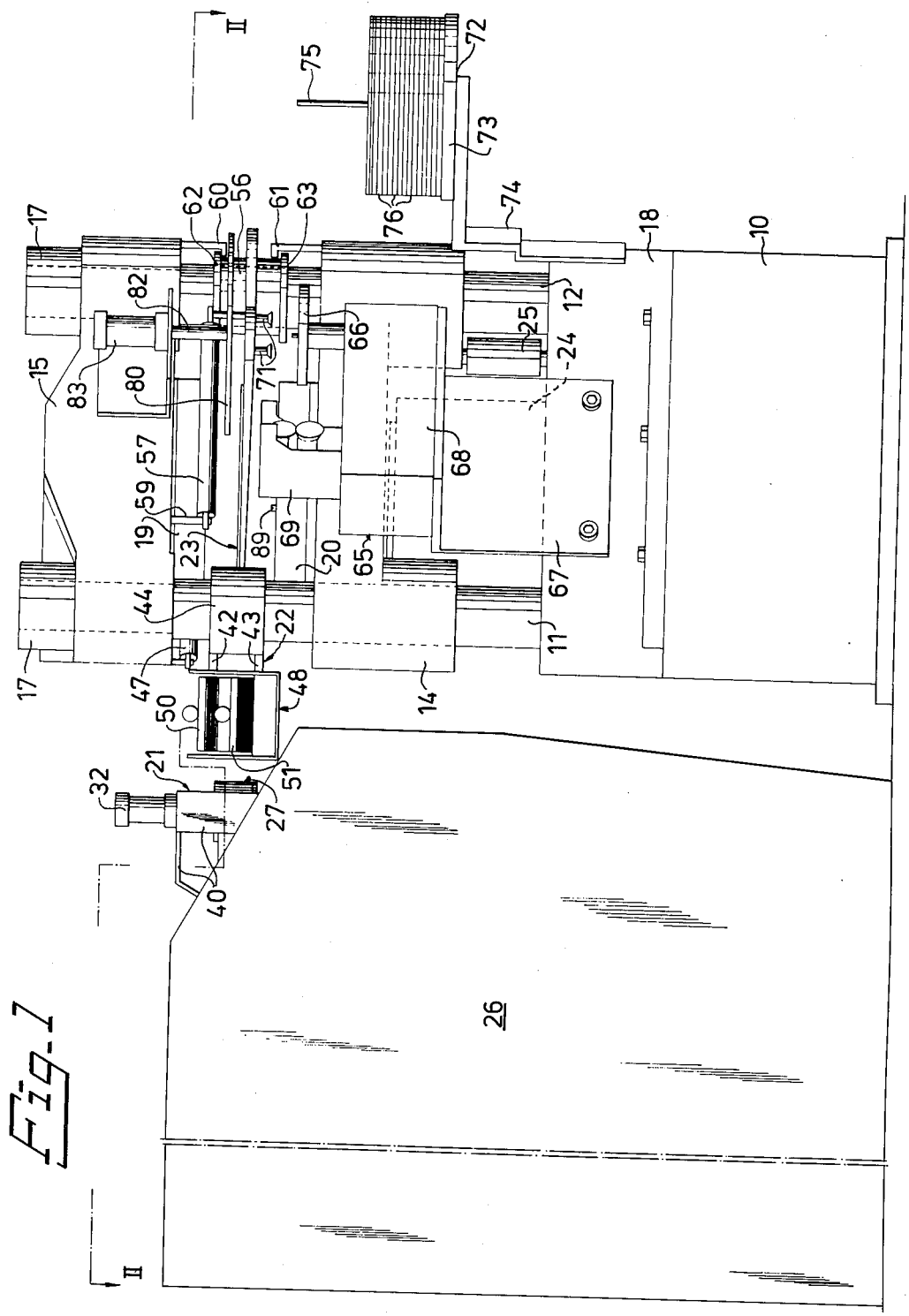
FIG. 1 is a side view of a preferred embodiment of a grammophone record press according to the invention.

The grammophone record press according to FIGS. 1–6 includes a stand 10 carrying guiding columns 11, 12, 13 and press tables 14, 15. With the assistance of abutments 16 (FIG. 6) and nuts 17 the columns 11, 12, 13 are clamped between two pressure slabs, one of which is designated by 18 and in its turn is attached to the stand, while the other is formed by the upper press table 15. Each of the press tables 14, 15 carry a half 19, 20 of a substantially conventional grammophone record pressing tool. Auxiliary tools 21, 22, 23 are further associated with the press to feed the starting material to and remove pressed products from the working area of the press. In the embodiment illustrated only the one press table 14 is movable by means of driving equipment 24, 25 for moving the tool halves 19, 20 towards and away from each other, but it is also within the scope of the invention to have both press tables movable, although further driving equipment would be required here for the second press table and a further pressure slab would be required at the opposite ends of the columns 11, 12, 13 to the pressure slab 18.

Figure 6:
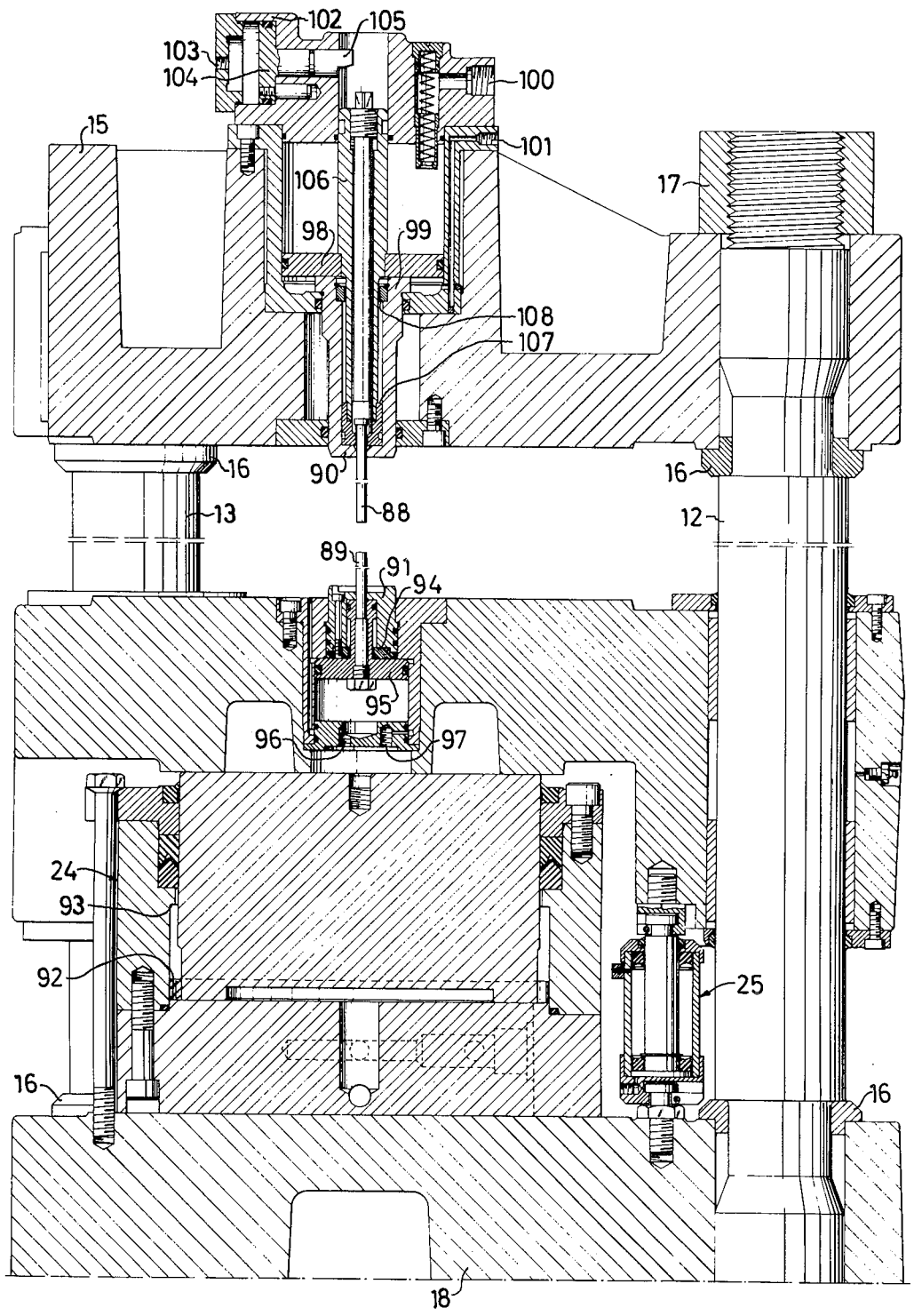
FIG. 6 is a vertical section through the press itself, with the press tool and auxiliary tools removed.

The driving equipment for the press table 14 is shown in more detail in FIG. 6. This equipment comprises a pressure cylinder 24 for forcing the press table 14 in a direction towards the press table 15, and a number of return cylinders only one of which is visible and is designated by 25 in FIGS. 1 and 6, for returning the lower press table 14 to its lower position, in which it is shown on the drawing.

In the preferred embodiment shown each of the auxiliary tools 22 and 23 is mounted on guiding columns 11 and 12 respectively for swinging between a position outside the working area of the press and a position of alignment in relation to the central axis of the tool halves 19, 20.

It is naturally within the scope of the invention for the auxiliary tool to be alternatively mounted so that it can be displaced along a rectilinear path between both said positions.

In coordination with the press there is also a device 26, essentially of the known type sold by Toolex Alpha AB, Sundbyberg, Sweden under the designation Extromat 3, for pre-working, heating and metering plastic compound. The device 26 is well-known to one skilled in the art, and will therefore only be described to the extent in which it is modified to suit the shown embodiment of the press according to the invention, and to the extent required for explaining the invention.

On and in the upper portion of the device 26 there is mounted, as shown in FIGS. 1–3, a metering device generally designated by 27, the device being coordinated with means for feeding a moulded cake of preheated plastic compound, essentially cylindrical in the example shown, to a position between the tool halves 19, 20. The metering device 27 includes a mould consisting of three parts 28, 29, 30 of which the parts 28, 29 are arranged to be moved apart by means of respective pressure cylinders 31 and 32 to expose a ready-moulded cake for introduction into the working area of the press, while the remaining mould part 30 is displaceable by means of pressure cylinder 33 for taking a cake with it from the position shown to a position in which the cake is located substantially centrally between the two tool halves 19, 20. As shown, the part 30 forms only a portion of the cylindrical inner wall of the mould, and to enable retention of the cake after the mould portions 28, 29 have been parted, part 30 is provided with two commonly parallel forwardly projecting retaining prongs 34, tapering therefrom. An injection head 35 is connected to one end of an only partially shown cylindrical housing 36 (FIG. 3), incorporated in the device 26 in a conventional manner, the housing containing a screw device for working and feeding the plastic material from which grammophone records are to be made. The injection head is adapted with a nozzle-like portion 37 to be fitted into a portion of the upper side of the mould part 28 and an opening formed by a recess in the form part 30, during the formation of a cake. In the formation of a cake, the screw device situated in the housing 36 is thus driven by a driving mechanism, not shown, so that plastic compound passes via the head 35 and its nozzle 37 into the moulding cavity bounded by the parts 28, 29, 30. The piston rods of the cylinders 33 are then in their retracted positions, while the piston rods of the cylinders 31, 32 are in their extended position. The cylinder 31 associated with the mould portion 28 exerts a weaker force than the cylinder 32 associated with the mould portion 29, and is furthermore not capable of withstanding the pressure of the plastic compound discharging through the injection head 35 when the moulding cavity has been completely filled. Thus, when the cavity is filled, the mould part 28 is pressed downwards, and after a short distance of travel, substantially less than the stroke of the cylinder 31, it operates a limit switch 38 located in its path, thereby causing the screw device drive to stop and consequently also the feed of the plastic material to the injection head 35. To open the mould, the piston rods of the cylinders 31, 32 are thereafter moved to their retracted positions, whereafter the moulded plastic cake carried by the prongs 34 on the form part 30 can be introduced into the working area of the press by means of the cylinders 33, where it is gripped, together with two labels, in a manner more closely described below, whereafter the piston rods of the cylinders 33 and the mould part 30 can be returned to the position shown in FIGS. 1–3. The mould part 30 is carried by the outer ends of the piston rods of the cylinders 33 via holders 39. Each mould part 28, 29 is similarly carried by the outer end of the piston rod of the respective associated cylinder 31 and 33. The cylinders 31, 32 and the limit switch 38 are carried by the device 26 via a bracket means 40. The limit switch 38 contact means 41 causes a break practically as soon as it is engaged by the mould portion 28, but can move downwards from the breaking position so that the piston of the cylinder 31 can be retracted completely without being hindered by the limit switch 38, The auxiliary tool 22 intended for introducing grammophone record labels into the working area of the press comprises two arms 42, 43 which at 44 (FIG. 1) are commonly mounted on the guiding column 11. As is most clearly shown in FIGS. 2 and 3, the arms 42, 43 are hollow at least at their free ends, and the cavities 45 are connectable to a source of negative pressure by means not shown. Both arms 42, 43 are situated with their free ends at such a distance from each other that the mould portion 30 with a plastic cake can pass between them without hindrance. The arms, in the sides facing away from each other are provided at their free ends with holes 46. The arms 42, 43 are mutually pivotable about the column 11 by means of a pressure cylinder 47, one end of which is pivotably connected to the arm 42 and the other end of which is pivotably connected to the upper stationary press table 15, between the illustrated position outside the working area of the press, in which they are each arranged to pick up a grammophone label from a label magazine generally designated by 48, and a position aligned in relation to the central axis of the tool halves 19 and 20, in which they are arranged to deliver the labels carried. In the latter position, the labels together with a plastic cake fed in by the auxiliary tool 21, are gripped by means of centre pins coordinated with the tool halves 19, 20, and more closely described below. To allow for return swing of the arms 42, 43 when said central pins have passed through the labels and into the plastic cake, arcuate slots 49 are formed in the arms. The label magazine 48, which does not form part of the invention and therefore is not shown and described in detail, is provided with spaces for stacks of labels for the respective upper and lower sides of the records. By means of weights 50, 51, the label stacks are urged against conveying means not shown for conveying the labels one at a time from each stack to zones 53 between the free ends of the arms 42, 43, when the latter are in the position shown in FIGS. 1–3, and guiding plates 52 incorporated in the magazine 48, in which zones the labels are attached to the holes 46 by the provision of sub-pressure in the cavities 45. When the labels are delivered to the working area of the press, communication of the cavities 45 with the source of sub-pressure is disrupted.

In the next following the particularly outstanding arrangement according to the invention in moulding presses of the kind in question will be described with reference to the preferred embodiment of the auxiliary tool 23 shown in FIGS. 1, 2, 4 and 5 for extracting ready-pressed objects from the working area of the press. This auxiliary tool 23 includes an arcuate portion or a holding means 54, which is carried by an arm 55 which in turn is supported by a bearing sleeve 56, mounted for rotation about the column 12 and for being longitudinally displaced to a limited extent along said column. The arm 55 is arranged to be swung by means of a pressure cylinder 57, which at 58 (FIG. 2) is pivotably connected with the arm 55 at one of its ends, and is pivotably connected at 59 (FIG. 1) to the press table 15 at its other end. The longitudinal displaceability of the sleeve 56 is limited by stops 60, 61, each of which is supported by the press tables 14, and 15 respectively and which are arranged, in a manner more closely described below, to engage each one of the end flanges 62 and 63 on the sleeve 56. The auxiliary tool 23 is pivotable between the extracting position shown in full lines in FIGS. 1 and 2, and the delivery position indicated in FIG. 2 by chain-dotted lines, in which latter position, the ready-pressed object 64 extracted from the working area of the press as shown in detail in FIG. 4, is located directly above a rotatable, raisable and lowerable supporting plate 66 incorporated in an edge trimming device 65.

The edge trimming device 65 is mounted on a bracket 67 attached to the lower slab 18, and includes in a conventional manner a housing 68 containing necessary driving and operating means, and a trimming head 69 pivotable about a vertical axis and provided with rotatable cutting wheels or the like, which are adapted to be brought into engagement with and to trim the peripheral edge of the pressed object 64, so that said edge is relieved of flash and the like formed during the pressing operation.

The sleeve 56 also carries a further arm 70, forming an angle with the arm 55, and which is provided with a number of suction cups 71 which can be connected to a source of subpressure. The angle between the arms 55 and 70 is such that the arm 70 is located with its suction cups 71 immediately above the supporting plate 66 when the arm 55 is located in its extracting position. Trimmed objects 64 can be picked up from the supporting plate 66 by means of the suction cups 71, and simultaneously as the arm 55 is swung to its delivery position, the object 64 is conveyed to a magazine 72 for finished grammophone records, where communication with a source of subpressure to the suction cups 71 is interrupted and the conveyed record is released onto the magazine 72. The magazine 72 is shown to consist of a plate 73, carried by a bracket 74 attached to the slab 18, and provided with an upstanding centre pin 75 for aligning the grammophone records 76 delivered onto the magazine.

In the pressing operation itself, when the tool halves 19, 20 are moved together and therebetween press a received cake of thermoplastic material into a record, an excess of the thermoplastic material exudes out at the peripheral boundary zones between the tool halves. The holder 54 of the auxiliary tool 23 is adapted for location immediately outside the juxtaposed tool halves 19, 20 during the pressing operation, and is arranged to be adhered to the excess material exuding out at a plurality of separate places distributed along substantially the entire extension of said boundary zones for the purpose of retaining the pressed object while extracting it from the pressing area. Outside the pressing area there is furthermore a device or an apparatus for separating the excess material from the holder 54 at said places. In accordance with the invention, the holder 54 in the example shown on FIG. 5 is provided with a plurality of projections 77 distributed in a ring, and taking the shape of radial studs or pins directed towards the centre of the holder, which in the illustrated, preferred embodiment are each provided with a cylindrical hole 78 directed towards the centre of the holder. The direction of the holes is however in no way critical, since what is important in this connection is that they are directed or open out in such a way that the excess material from pressing penetrates thereinto and after solidification is anchored therein and consquently also to the holder.

Within the scope of the invention there are many alternative arrangements and modifications of the example shown in FIG. 5 of the holes 78 serving as anchoring means, principle examples thereof being schematically shown in FIGS. 5A, 5B, 5C, 5D, 5E and 5F.

In FIG. 5A, showing in section a portion of an annular holder especially intended for a pressed product in the shape of a grammophone record, the holder body is denoted by reference numeral 110. Along the inner periphery of the holder body 110 a large number or recesses or holes 111 are taken up at a desired pitch, said holes being intended to form the anchoring means for the plastic compound exuding towards them during pressing. In this embodiment the recesses 111 are made as spherical segments. In as far as it is desired to carry out their easy cleaning when breaking the solidified excess material around the grammophone record for releasing it from the holder 110, the recesses 111 are made at most hemispherical, but usually less than a hemisphere, whereby the cap-shaped knobs cast in the recesses 111 loosen by themselves at or after shearing off the excess material along the inner periphery of the holder.

In the case where it is desired to retain solidified excess material in the recesses 111 permanently, the recesses are suitably formed as more than a hemisphere. The excess material exuding during pressing then melts together with the solidified and anchored hemispherically shaped bodies already in the recesses, the former thus joining the grammophone record with the holder via the new excess material which after terminated pressing operations is each time sheared off from the permanently anchored knobs.

In FIG. 5B, is shown a similar example to the last-mentioned application with permanent anchorage of plastic knobs or the like directly in the body of the holder. In this Figure the holder is denoted by 112 and a large number of undercut holes in the body of the holder by reference numeral 113, said holes suitably being in the shape of a truncated cone. The surfaces of the recesses or holes 113 are thus also in this embodiment made so that they prevent unintentional forcing out of the plastic filling solidified therein, especially during the shearing operation carried out when the grammophone record itself is separated from the holder.

The FIGS. 5A and 5B apply to the simplest-alternative, in which the anchoring recesses are made directly in the body of the holder 110 or 111. According to the invention, these anchoring recesses can however, similarly to the example according to FIG. 5, be made with suitable projections which are attached to the holder. An example hereof is shown diagrammatically in FIG. 5C, wherein such a projection has for example the form of a chamfered stud 114 which by means of a screw 115 is screwed onto a holder not shown, and which is provided with a hole 116 in the shape of a truncated cone, tapering towards the apex 117 of the stud 114 and which is intended permanently to retain the excess material 118 cast therein against unintentional expulsion. This embodiment is in principle agreement with the embodiment according to FIG. 5B.

A modified embodiment of FIG. 5C is shown in FIG. 5D, in which the outer contour of the illustrated stud 119 is in substantial agreement with the corresponding shape of the stud according to FIG. 5C, while a screw 120 in the same way as the screw 115 in the latter figure is intended to serve the purpose of attaching the stud 119 to a holder not shown in the figure. The embodiment according to FIG. 5D is intended to illustrate in principle such embodiments according to the invention in which the necessary anchoring hole does not necessarily extend radially and axially in a projection attached to the holder, or radially when it is made directly in the body of the holder. As an example and for the sake of simplicity, a cylindrical anchoring hole 121 is shown in FIG. 5D, the axis of the hole forming an oblique angle to the axis of the stud 119.

Finally and while referring to FIGS. 5E and 5F, two further variations of the inventive object will be discussed, which in certain cases can have especially advantageous anchoring characteristics.

In FIG. 5E a portion of a holder is denoted by 122, in the body of which slots are made, wherein projections in the shape of flat strips or the like 123 are inserted and fixed in a radial direction. In each such strip 123 a through-going anchoring hole 124 is made, into which excess material can flow on passing along the strip 123 to be anchored therein after solidification.

In FIG. 5F a modified embodiment of FIG. 5E is shown, the holder being denoted by 125 and the strip fixed therein by 126. Compared with the embodiment according to FIG. 5E, the strips 126 are each provided at their free ends with two prongs or tongues 127 which are bent outwards in opposite directions, so that between themselves they form a concavity or grip 128 for the excess material coming out from the pressing operation. In as far as it is required, each tongue 127 can be provided with a through going anchoring hole 129. The concavity 128 formed between the tongues 127 of each strip is considered a modified anchoring hole in itself.

The anchoring holes may otherwise be varied within wide limits both with regard to their shape and to their direction.

In order to separate the pressed object 64, in the delivery position of the auxiliary tool 23, from the holding means 54 at the joining places formed by the studs 77 where the object while being pressed is moulded together with the holder 54, there is arranged a raisable and lowerable, substantially circular plate or disc 80 directly above the plate 66, the diameter of the disc 80 exceeding the distance between diametrically opposed projections 77 but less than the inner diameter of the holding means 54. In the periphery of the disc 80 there are recesses or notches 81, which enable the disc 80 to be lowered through the holding means 54 while breaking the material joint between the object 64 and the anchoring means 77. According to what has been indicated above, a portion of thermoplastic material hereby remains in the holes 78, said material flowing together or being welded together at a new pressing operation with the excess material exuding at the boundary zones between the tool halves 19, 20. The holes 78 can also initially be filled with a material with a propensity for being welded together with the thermoplastic material exuding between the tool halves 19, 20.

A tool similar to the auxiliary tool 23 can to advantage be used in other connections for extracting hot pressed products of plastic material of varying configurations from parted press moulding tools, where excess material exudes in the boundary zones between the tool halves when pressing the products. Instead of holed studs 77, suitably undercut holes or slots made in the holder itself may be used according to the above, or such studs may be used, of a material which in itself has a propensity for adhering to the excess material exuding in the boundary zones, or the studs can alternatively be so shaped that the excess material is forced to flow onto them in such a way as to form gripping contact.

The disc 80 is carried by the piston rod 82 of a pressure cylinder 83 which in its turn is carried by the pressure head 15 (FIG. 1).

The press tool halves 19, 20 can also be mounted so that they can be pivoted about one of the press columns. In FIG. 2 the tool half 20 is shown mounted on an arm 84 which is pivotally mounted on the column 13. Since it is of very great importance that the tool halves are very exactly aligned to each other, special aligning devices shown in more detail in FIG. 6 are arranged for the tool halves, there being a certain play between the arm 84 carrying the tool half and the column 13, as is exaggeratedly shown in FIG. 2 at 85. At 86 is indicated a connection which allows turning the tool half 20 about an axis at right angles to the column 13, after the arm 84 with the tool half 20 has been swung out so far that the tool half 20 is no longer supported by the press table 14. The said pivotability facilitates inspecting the tool halves and exchanging the dies thereon. Flexible hoses for supplying heating and cooling media are denoted by 87, said hoses also allowing for the swinging and pivoting movements of the tool half 20.

The aligning devices for the tool halves are shown in FIG. 6. In the chosen example, said devices are coordinated with center pins for gripping cakes of thermoplastic material and grammophone labels supplied to the working area of the press, and for making central holes in the pressed objects. Center pins 88, 89 are arranged in the chosen example to pass through a central hole in the respective associated tool half 19 or 20, while each of the aligning devices comprises an essentially cylindrical portion 90, 91 which is arranged to be fitted with a tight fit in a recess in the respective associated tool half 19 or 20, while the respective half is kept pressed against the associated press table 14 or 15 by means not shown.

For bringing together the press tool halves 19, 20, the pneumatic cylinder 24 is connected via suitable holes and ducts to a pressure source, whereas parting the tool halves in the illustrated example takes place by means of special pressure cylinders 25. The latter are always pressurized on their minus side but exert less force than the pressure cylinder 24, so that they can retract the press table 14 first after the communication of cylinder 24 with the pressure source is interrupted and the pressure medium is allowed to leave cylinder 24. At 92 and 93 stopping means are shown for limiting the stroke of the cylinder 24.

The center pin 89 and the aligning portion 91 for the lower tool half 20 are incorporated in a pressure cylinder assembly wherein the centre pin 89 is connected to a piston 95 and the aligning portion 91 is a portion of piston 94. Pressure medium can be supplied to the plus side of the piston 94 via a duct 96, whereas pressure medium can be supplied between the pistons 94, 95 via a duct 97. In the illustrated position, both ducts 96, 97 are connected to the pressure medium source, which in the present case is a compressed air source. To lower the pin 89 the duct 96 is depressurized. To lower the aligning portion 91 both ducts 96 and 97 are depressurized.

The center pin 88 and the aligning portion 90 for the upper tool half 19 are incorporated in a pressure cylinder assembly, wherein the center pin 88 is connected to a piston 98 and the aligning portion 90 is a portion of piston 99. Pressure medium can be supplied to the plus side of the piston 98 via a duct 100, and pressure medium can be supplied between the pistons 98 and 99 via a duct 101. In addition, a pressure cylinder 102 is arranged, which via a connection 103 can be pressurized on the plus side of a piston 104. The piston 104 carries a latching means 105 which is adapted to be brought into engagement with a holder 106 for the pin 88. In the embodiment shown, the pressure medium is compressed air, and in the position shown in FIG. 6 the ducts 100 and 103 are connected to the pressure medium source, whereas the piston 99 is kept pressed down by the piston 98. To raise the pin 88 the duct 100 is depressurized and the duct 101 connected to the pressure medium source. The piston 98 with the holder 106 and the pin 88 is hereby raised until the upper end of the holder 106 is stopped by the latching means 105, whereas the pressure medium supplied via the duct 101 keeps the piston 99 and the aligning portion 90 pressed down. The ducts 100 and 103 are depressurized to raise the aligning portion 90, whereas the duct 101 is connected to the pressure medium source. The holder 106 with the pin 88 will first rise, until a stop 107 on the holder 106 engages an abutment 108 on the piston 99, bringing the piston 99 with it upwards.

The force applied by the piston 98 is greater than that of the piston 95, enabling the upper pin 88 to press down the lower pin 89 when the piston 95 is pressurized on its plus side. The necessity is hereby avoided of so exactly adapting the lengths of the pins 88 and 89 that their ends will first meet when the tool halves 19 and 20 are completely brought together.

Pressing a grammophone record utilizing the press according to FIGS. 1–6 takes place in the following manner.

The tool halves 19 and 20 are assembled on the respective associated press table 14, 15 and parted to a maximum extent. The centre pins 88, 89 are retracted but the aligning portions 90, 91 are protruding. The auxiliary tools 21 and 22 are in the position shown in FIGS. 1–3, whereas the auxiliary tool 23 is in the position indicated in FIG. 2 by dotted lines. Using the device 26, a cake of pre-plasticized thermoplastic material is now made, and record labels are sucked onto the free ends of the arms 42, 43. Thereafter, the cylinders 31 and 32 are pressurized on their minus side and the cylinders 33 and 47 on their plus side, the cake being conveyed on the prongs 34 and the labels on the arms 42, 43 to a central position between the tool halves 19, 20. The center pins 88, 89 are now moved towards each other, whereat, in the working area of the press, they pass through the central holes in the labels and into the cake, the nagative pressure in the chambers 45 of the arms 42, 43 being caused to cease and the pistons 33 and 47 being pressurized on their minus side so that the auxiliary tools 21 and 22 return to their positions shown in FIGS. 2 and 3, whereas the cylinder 57 is pressurized on its minus side so that the holder 54 is swung in between the tool halves 19, 20. Pressure medium is simultaneously supplied to the cylinder 24 so that the press table 14 is brought towards the press table 15, thereby bringing the tool half 20 against the tool half 19. In a known way, heating medium is passed through the tool halves 19, 20 to heat the surfaces facing each other and carrying the dies. The holding means 54 is engaged and taken upwards in such a way by the lower tool half 20 that it will be located with the means 77 opposite to the boundary zone between the tool halves 19, 20 when the latter have been moved into contact with each other. Immediately before the tool halves have come into contact with each other, the ends of the pins 88, 89 abut each other while making a central hole in the object 64, the pin 89 being pressed backwards slightly by the pin 88.

During the pressing operation itself, excess thermoplastic material is pressed out in the boundary zone between the tool halves 19, 20, passing into the holes 78 in the means 77 or being moulded or welded together with the thermoplastic material possibly already in said holes, as well as forming flash in the areas between the means 77. After a completed press operation, cooling medium is passed through the tool halves in a known manner to cool the pressed product 64 so that at least its outer layers solidify. The pressure medium is thereafter caused to leave the cylinder 24 so that the press table 14 and the tool half 20 is lowered by means of the cylinders 25. The holding means 54 and the object 64 carried by it accompanies the tool half 20 downwards, possibly after having first been forcibly separated from the upper tool half 19 by the stop 61 engaging the flange 63. After a certain amount of movement downwards, the holder 54 is arrested by the stop 60 engaging the flange 62. The pins 88, 89 have hereby left the central hole of the pressed object 64.

Thereafter the plus side of the cylinder 57 is pressurized so that the holder 54 is swung to an alignment position above the plate 66, which is raised so that its centre pin enters a small distance into the central hole of the object 64, simultaneously with the disc 80 being lowered for shearing off the connections between the object 64 and the means 77. Following this, the disc 80 is raised and the disc 66 lowered into a position wherein the peripheral edge of the object 64 is located opposite to the trimming head 69, which is now turned towards the object 64 and caused to cut its edge clean so that a completed grammophone record is obtained.

During the edge trimming, a new cake and new labels have been introduced into the working area of the press in the above described manner, while the holder 54 has been swung into the position shown in full lines in FIG. 2. After edge trimming, the trimming head 69 is swung away again, and the disc 66 is raised until the completed grammophone record comes into contact with the suction cups 71 which are connected to a source of sub-pressure for vacuum retention of the grammophone record, while the disc 66 is lowered again. Upon the subsequent extraction of a pressed article 64 from the working area of the press by pressurizing the cylinder 57 on its plus side, the arm 70 and the trimmed grammophone record supported thereby is swung to a position of alignment above the magazine 72, wherein the grammophone record is deposited by breaking the communication of the suction cups 71 with the source of sub-pressure.

It will be appreciated that the pressing operation can preferably be made completely automatic.

The invention is not limited to the embodiment described and shown on the attached drawing, but its construction can be modified in many ways within the scope of the following patent claims.

We claim:

1. An arrangement in moulding presses with parted press tools for the production of hot-pressed products of plastic material, especially grammophone records, a holder for the pressed product being arranged, before starting the pressing operation to be entered into an exuding zone for the excess material from the pressing operation to assure its position in the press, and subsequent to the termination of the pressing operation, in company with the ready-pressed product attached thereto through the intermediary of the excess material exuded during the pressing operation, to be moved away for releasing the ready-pressed product from the holder, situated outside the pressing area, characterized in that the holder presents a ring, encircling at least the major portion of the perimeter of the pressed product, comprising a plurality of anchoring means distributed in and along the exuding zone of the excess material for attaching the pressed product to the holder by the excess material exuding onto, and solidifying in engagement with said anchoring means, and that said apparatus includes a shearing means, movable essentially transverse to the plane of the ring of anchoring means, for breaking the pressed product loose in the region of said anchoring means.

2. An arrangement as claimed in claim 1, characterized in that the anchoring means consists of holes or concavities in the holder itself or projections united with its body.

3. An arrangement as claimed in claim 2, the anchoring means being arranged directly in the material of the holder, characterized in that the anchoring means constitute cavities having the surface of a spherical segment, for facilitating their cleaning from excess material solidified therein when preparing the holder for a subsequent pressing operation.

4. An arrangement as claimed in claim 2, the anchoring means being arranged directly in the material of the holder, characterized in that the anchoring means constitute open recesses formed with surfaces which lock the solidified excess material which has flowed thereinto against unintentional expulsion through the openings of the recesses.

5. An arrangement as claimed in claim 4, characterized in that the recesses constitute undercut holes, slots or the like.

6. An arrangement as claimed in claim 5, characterized in that the holes have the form of a truncated cone with the lesser base area facing away from the holder.

7. An arrangement as claimed in claim 2, the holes or concavities being arranged in projections attached to the holder, characterized in that the projections consist of studs with a central hole enlarging from the opening towards the body of the holder, preferably shaped as a truncate cone.

8. An arrangement as claimed in claim 2, the holes or concavities being arranged in projections attached to the holder, characterized in that the projections constitute studs narrowing towards their free ends and that the holes are directed at an oblique angle towards the central axis of the studs.

9. An arrangement as claimed in claim 2, the holes or concavities being arranged in projections attached to the holder, characterized in that the projections constitute strips anchored in the holder body and provided with through-going holes extending at right angles thereto.

10. An arrangement as claimed in claim 2, the holes or concavities being arranged in projections attached to the holder, characterized in that the projections consist of strips anchored in the holder body, from the free ends of which extend two tongues commonly converging towards the holder body, said tongues forming between themselves a rataining or inwardly guiding concavity for the flowing excess material and furthermore being provided where so required with through-going holes for receiving excess material flowing thereinto.

11. An arrangement as claimed in claim 1, characterized in that the holder consists of a frame encircling at least the major portion of the perimeter of the pressed product, the parts of the frame facing said perimeter being provided with the anchoring means.

12. An arrangement as claimed in claim 4, characterized in that the holes are arranged permanently to retain excess material, solidified therein from press operation to press operation, to be melted at repeated press operations together with excess material flowing thereonto.

13. An arrangement as claimed in claim 7, characterized in that the anchoring means are arranged in projections having such a design that the excess material advancing during pressing is guided by the contour of said means and after solidification creates extra anchorage for the pressed product in relation to the holder.

14. An arrangement as claimed in claim 7, characterized in that the projections extend radially from the holder.

15. An arrangement as claimed in claim 14, characterized in that the holes extend radially through the projections.

16. An arrangement as claimed in claim 14, characterized in that the holes extend at right angles to the general axial direction of the projections.

17. An arrangement as claimed in claim 1, characterized in that the holder is guided for carrying out translatory movements between its positions in the pressing area and the apparatus for breaking the ready-pressed product away from the holder, situated outside the pressing zone.

18. An arrangement as claimed in claim 1, characterized in that the holder is pivotally mounted for carrying out swinging movements between its position in the pressing area and its position in the apparatus for breaking the ready-pressed product away from the holder, situated outside the pressing zone.

19. An arrangement in a moulding press of column type, preferably of the three-column type according to claim 18, characterized in that the holder is pivotally mounted about one of the mounding press columns.

20. An arrangement as claimed in claim 11, characterized in that the frame is broken in one place to provide an opening which is sufficiently large and so placed as to enable the frame to be introduced into its position in the pressing area past a cake of plastic material from which the product is to be press-moulded and which is placed in the plane of movement of the frame between the tool halves of the moulding press.

* * * * *